United States Patent Office 3,063,998
Patented Nov. 13, 1962

3,063,998
CAFFEINO-8-ISOPROPYL-PHENYLAMINE
Josef Klosa, 13 Janickestrasse, Berlin-
Zehlendorf, Germany
No Drawing. Filed Apr. 30, 1959, Ser. No. 809,918
4 Claims. (Cl. 260—256)

The present invention relates to a new caffeine derivative which has been established to have central nervous system (CNS) stimulating capacity without disadvantageous side effects. A number of caffeine derivatives with basic substituents in position 8 are known. (E. Fischer, Ann. d. Chem., vol. 215 (1882), p. 253; L. Cramer, Ber. d. Deutsch. Chem. Ges., vol. 27 (1894), p. 3098; A. Einhorn & E. Baumeister, Ibid., vol. 31 (1898), p. 1138; J. Gomberg, Am. Chem. J., vol. 23 (1901), p. 51; F. Blicke et al., J. Am. Chem. Soc., vol. 76 (1954), p. 2835.) These compounds did not become important since they offered no advantage compared with caffeine. On the contrary, they had either a reduced activity compared with caffeine, or no activity at all, or they have proved to be more toxic.

I have now found that the new, as yet not described caffeino-(8)-isopropyl-phenylamine of the formula

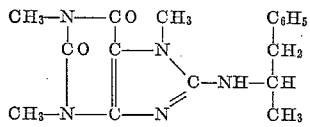

possesses a superior CNS stimulating activity (compared with caffeine) and is antagonistic to barbiturates, without, however, having such an accentuated stimulating activity to prevent sleep.

The base compound of this invention can be obtained as the racemate or its isomers.

The discovery that the base compound of the present invention does not affect circulation is surprising in view of the fact that no indication of such characteristic was found in previously known caffeino-(8)- derivatives.

For instance, caffeino-(8)-phenylethylamine, 8-morpholino-caffeine, 8-piperidino-caffeine, 8 - benzylamino-caffeine, etc. are completely without a CNS stimulating action. It seems that basic substituents practically deprive caffeine of this activity. On the other hand phenylisopropylamine is known to have a strong CNS stimulating action and when the amino group of this compound is substituted by a methyl group, the resulting phenyl-methyl-isopropyl-amine also has a strong activity. However, the CNS stimulating activity is lost when higher alkyls, such as propyl, butyl and the like take the place of the methyl group. The caffeino-radical is a large and relatively complex structure. In fact, when the theophyllino-radical is used as a substituent in the amino-group of phenyl-isopropylamine, the resulting compound shows, as expected, no CNS stimulating activity at all. On the contrary, the theophyllino-(8)-isopropylphenylamine shows a sedative and not a stimulating activity in the motility test with white mice. This is why the central stimulating activity of the said compound is quite unexpected and surprising. This compound has the further advantage that it is much less toxic than caffeine and the already known and widely used CNS stimulating drugs. The $DL_{50}$ in white mice in subcutaneous application is as follows:

Caffeine, $DL_{50}$ in mg./kg _____ 350
Caffeino-(8)-isopropylphenylamine _____ 1065
2-phenyl-3-methyl-morpholine _____ 200
1-phenyl-2-aminopropane (phenylisopropylamine)_ 70

The CNS stimulating activity of the said compound is about ½ to ⅓ as strong as that of 2-phenyl-3-methyl-morpholine (phenmetrazine) when tested on the increase in motility of mice and rats, but its activity is definitely stronger than that of caffeine. It is of the utmost importance, therefore, when a compound is discovered which eliminates the feeling of fatigue and other symptoms by means of mild stimulation, but which has no effect upon the circulation even in high doses. Such a compound has not been known prior to the discovery of the said compound. See W. Graubauer, Angew, Chemie., vol. 66 (1954), p. 3741. The barbiturate-antagonistic effect of said compound has been demonstrated with the following experiment:

As is known, hypnotics influence the ability to coordinate the movements of experimental animals. To measure the effect of drugs a standard method measures the ability of mice to stay on a horizontal wooden rod being rotated 8 times per minute. As a preliminary to the experiment, all animals which are unable to stay on the rod for at least 3 minutes were eliminated. 45 mg./kg. phenyl-crotyl-barbituric acid was subcutaneously administered to 10 animals and over the period of one hour the medial staying time of the animals was checked every 15 minutes.

Drugs with a CNS stimulating action cause a reduction of the ability of the animals to coordinate their movements. Caffeine and the new caffeino-(8)-isopropyl-phenylamine were used in doses of 20% of the $DL_{50}$. The results are as follows:

The administration of caffeine does not improve the ability of the animals to coordinate their movements.

After the use of the new caffeino-isopropylphenylamine it is found that the animals can stay on the rotating rod several times as long as without the administration of the drug.

This proves the superiority of the CNS stimulating action of the compound of this invention compared with caffeine. Its diuretic activity is much weaker than that of caffeine and experiments with animals have shown that it is without activity on the circulation and the heart.

The new compound may be prepared by the methods known per se for introducing alkyl-groups into an amino group. 8-halogeno-caffeine may be reacted with phenylisopropylamine with or without the presence of known reagents for the splitting off of hydrohalogens. The 8-halogeno-caffeine may be heated to 140–175° C. with phenylisopropylamine without a solvent, or the two reactants may be refluxed for several hours with a suitable solvent, for instance toluol, xylol, tetralin, alcohols. An alkalibromide or iodide speeds up the reaction.

The compound may also be combined with non-toxic pharmacologically and pharmaceutically acceptable acids to form acid addition salts. The free base, as well as the salts, are useful as stimulants and also as intermediates for the production of stimulants and other drugs. A particular advantage of this compound is that it is practically tasteless and thus may be easily incorporated into vehicles to form good-tasting finished medicinal preparations.

*Example 1.—d-1-N-[caffeino-(8)]-isopropyl-phenylamine*

44 gms. 8-chlorocaffeine are mixed with 44 ml. d-1-phenyl-isopropylamine and the mixture heated in 15–20 minutes under stirring to 140° C. A melt results, while the temperature rises to 170° C. The temperature is kept for another 20–30 minutes at 160–170° C. The melt thickens some; its color is yellow-brown. The temperature is allowed to drop to 160–150° C., and kept there for another 30–40 minutes. On cooling a thick melt results. This is taken up in 70 ml. alcohol; the solution is filtered hot and then again cold, if on cooling a cloudiness has developed. 20 ml. water are added which causes a cloudiness which may disappear again, but after 6–12 hours crystals form. The crystals are removed and more water is added to the filtrate which causes a second crop to crystallize in a few hours. The total yield is 35 gms. and by continuing the addition of water to the mother liquor more crops can be obtained, bringing the total yield to about 43 gms.

The M. P. is 172–174° C.; the compound is soluble in benzol and alcohol; insoluble in water and ether; and soluble in mineral and organic acids under formation of salts.

The same product may be obtained by refluxing 8-bromocaffeine and phenylisopropylamine with toluol for 48 hours.

*Example 2.—d-N-[caffeino-(8)]-isopropyl-phenyl-amine*

44 gms. 8-chlorocaffeine (or the equivalent quantity of 8-bromocaffeine) are heated, as in Example 1, but with 44 ml. di-phenyl-isopropyl-amine. A thick, yellow mass results. This is taken up in 50 ml. alcohol, filtered hot and 15–20 ml. water added. The crystals appear in about 3 hours. It may be recrystallized from benzol or preferably from alcohol-water.

The yield is about 46 gms., M.P. 103–105° C. It solidifies again at 120° and then melts again at 178–180° C. $[\alpha]_D^{20}$ +180° (30% in ethanol).

*Example 3.* — 1-N - [caffeino - (8)] - isopropyl-phenyl-amine may be prepared in the same manner as the method of Example 2, except that 1-phenyl-isopropyl-amine is employed. The resulting melting point is found to be 85–87° C., $[\alpha]_D^{20}$ −87.5° (2% in ethanol).

In addition to the bases described above pharmaceutically acceptable acid addition salts of such bases may be easily prepared by conventional means by acid-base neutralizations, metathesis and other known means. Such salts approximate the bases in pharmaceutical effect. Since the nitrogen group attached to the cyclical 8-carbon is essentially a secondary amine it forms the active site for the attachment of the addition radicals. Among the salts which may be so formed are the hydrochloride, the hydroiodide, the sulfate, the phosphate, the nitrate, the acetate, the benzoate, the salicylate, the glycolate, the succinate, the nicotinate, the tartrate, the maleate, the malate, the lactate and the like.

The above enumeration is made without restriction. The pharmacologically acceptable acids would all appear to form effective compounds.

The compounds of the present invention are active as mild CNS stimulants providing an activity somewhat superior to that of caffeine but without the undesirable cardiovascular effects of caffeine. They may be incorporated in conventional dosage forms, the crystals and powder being first granulated with a carrier such as lactose and then compressed into tablets. The compounds may also be made into liquid pharmaceutical specialties in the form of solutions, suspensions, elixirs and the like. Convenient tablet unit dosages incorporate 20 mg. of base or base equivalent per tablet and have been administered generally three times per day.

Although the present invention has been described with a certain degree of particularity, it is understood that the present disclosure has been made only by way of example and that numerous variations may be employed without transcending the scope of the invention as hereinafter claimed.

What is claimed is:

1. A compound selected from the group consisting of d, 1 and d–1 caffeino-(8)-isopropyl-phenyl-amine and the non-toxic pharmacologically acceptable acid addition salts thereof.
2. d-N-[caffeino-(8)]-isopropyl-phenyl-amine.
3. 1-N-[caffeino-(8)]-isopropyl-phenyl-amine.
4. d-1-N-[caffeino-(8)]-isopropyl-phenyl-amine.

References Cited in the file of this patent

UNITED STATES PATENTS

| | | |
|---|---|---|
| 2,575,344 | Jones et al. | Nov. 20, 1951 |
| 2,739,921 | Bennett | Nov. 27, 1956 |
| 2,799,675 | Ehrhart et al. | July 16, 1957 |
| 2,879,271 | Kallischnigg | Mar. 29, 1959 |

OTHER REFERENCES

Blicke et al.: Jour. Amer. Chem. Soc. volume 76, page 2835 (1954).

British Med. Journal, pages 938–939, April 19, 1958.

Laurence et al.: British Med. Journal, pages 700–702 (1958).

Goodwin et al.: The Pharmaceutical Journal, volume 181:4952, pages 233–235, September 1958.

Keele: The Lancet, pages 243–246, January 31, 1959.